United States Patent [19]

Kelemen

[11] Patent Number: 4,483,424
[45] Date of Patent: Nov. 20, 1984

[54] AUTOMATIC SLACK ADJUSTER

[75] Inventor: Ladislav Kelemen, Akron, Ohio

[73] Assignee: The Firestone Tire & Rubber Company, Akron, Ohio

[21] Appl. No.: 470,117

[22] Filed: Feb. 28, 1983

[51] Int. Cl.³ .............................................. F16D 65/56
[52] U.S. Cl. ........................ 188/196 BA; 188/79.5 K
[58] Field of Search .......... 188/71.9, 79.5 K, 196 BA, 188/196 P

[56] References Cited

U.S. PATENT DOCUMENTS

| | | | |
|---|---|---|---|
| 1,525,568 | 2/1925 | Chapin | 188/79.5 K |
| 3,374,867 | 3/1968 | Pirard | 188/79.5 K |
| 3,669,221 | 6/1972 | Hase | 188/79.5 K |
| 3,871,495 | 3/1975 | Devitt | 188/79.5 K |

FOREIGN PATENT DOCUMENTS 1538848  1/1979  United Kingdom .......... 188/79.5 K

Primary Examiner—Duane A. Reger

[57] ABSTRACT

An automatic slack adjuster for vehicle brakes includes an annular housing, a splined bushing within the housing, and unidirectional clutch between housing and bushing, the bushing having an annular surface frictionally engaged by the surface of a ring having limited rotation. Brake pressure is applied to a rotatable brake actuating mechanism on the forward (i.e., power application) stroke by an amount equal to brake-application and slack. On the return (i.e., non-powered) stroke, slack adjustment is provided by limited rotation of the ring, while the housing continues freely to automatically reset the device to its null position.

6 Claims, 3 Drawing Figures

AUTOMATIC SLACK ADJUSTER

In a brake system for heavy-duty vehicles, application of the brakes typically involves a pressure-activated piston rod acting on a brake arm which rotates an S-cam to spread the brake shoes apart against the brake drum.

Such brakes also typically include a slack adjusting mechanism between the piston rod and the cam which compensates and progressively takes up slack that is generated by wear of the brake shoes and the play normally present between parts of the system. Manual slack adjusting devices, in which piston rod travel is eventually reset by manual adjustment, are well-known in the art, and are shown in U.S. Pat. No. 4,234,064 to Tregoning; U.S. Pat. No. 2,522,903 to Shively; and U.S. Pat. No. 3,428,154 to Lodjac.

Manual units are being replaced, however, by so-called automatic units wherein adjustment is automatic and continuous, as required, without need for resetting. Such known automatic units are exemplified by U.S. Pat. No. 3,727,728 to Bostwick and U.S. Pat. No. 3,997,036 to Zeidler which, like a majority of known units, rely for their slack adjustment on a worm and worm gear combination. In such units the force of braking is generally applied in a "series" manner, through the adjusting mechanism itself, to the S-cam shaft, i.e., from the brake arm through the worm to the worm gear and to the S-cam shaft. These adjusters, therefore, one moment carry tremendous loads on their gear and other parts, while a moment later they must be able to undergo incremental adjustments. Additionally, such units frequently rely on the action of exterior auxiliary piston rods or tension members for activation of the adjustment, as well as internal friction clutches. This proliferation of parts invites not only increased costs, but problems of wear, maintenance and reliability as well.

It is, therefore, an object of the invention to provide an automatic slack adjuster for brakes wherein the braking force is applied directly to the brake shaft, with an independent mechanism for automatically adjusting the device so that slack, wear of parts and brake shoes, etc., do not result in increasing brake piston stroke.

DESCRIPTION OF PREFERRED EMBODIMENTS

Figure 1:
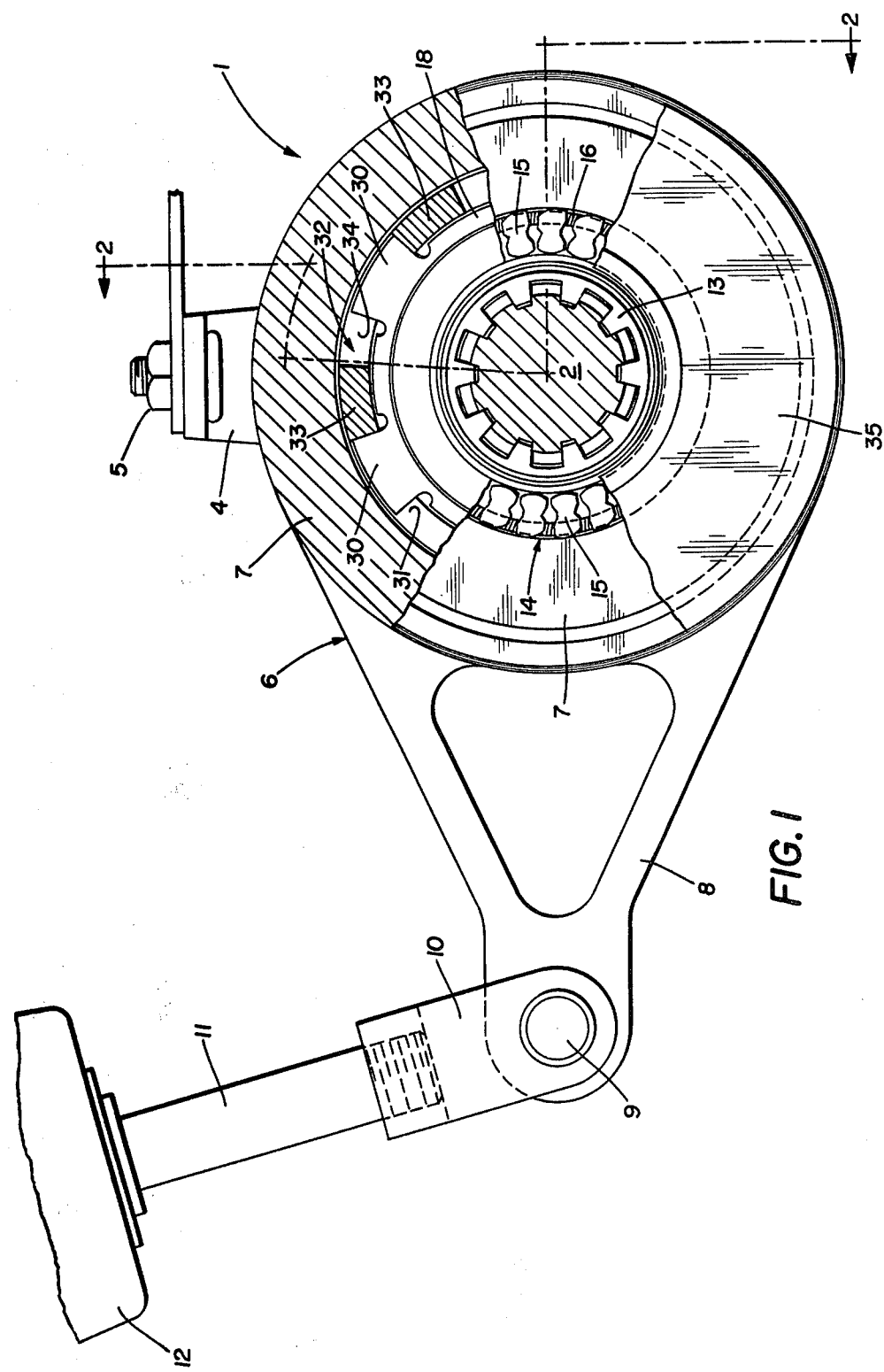
FIG. 1 is a side elevation, partially broken away, of the device of the invention.
Figure 2:
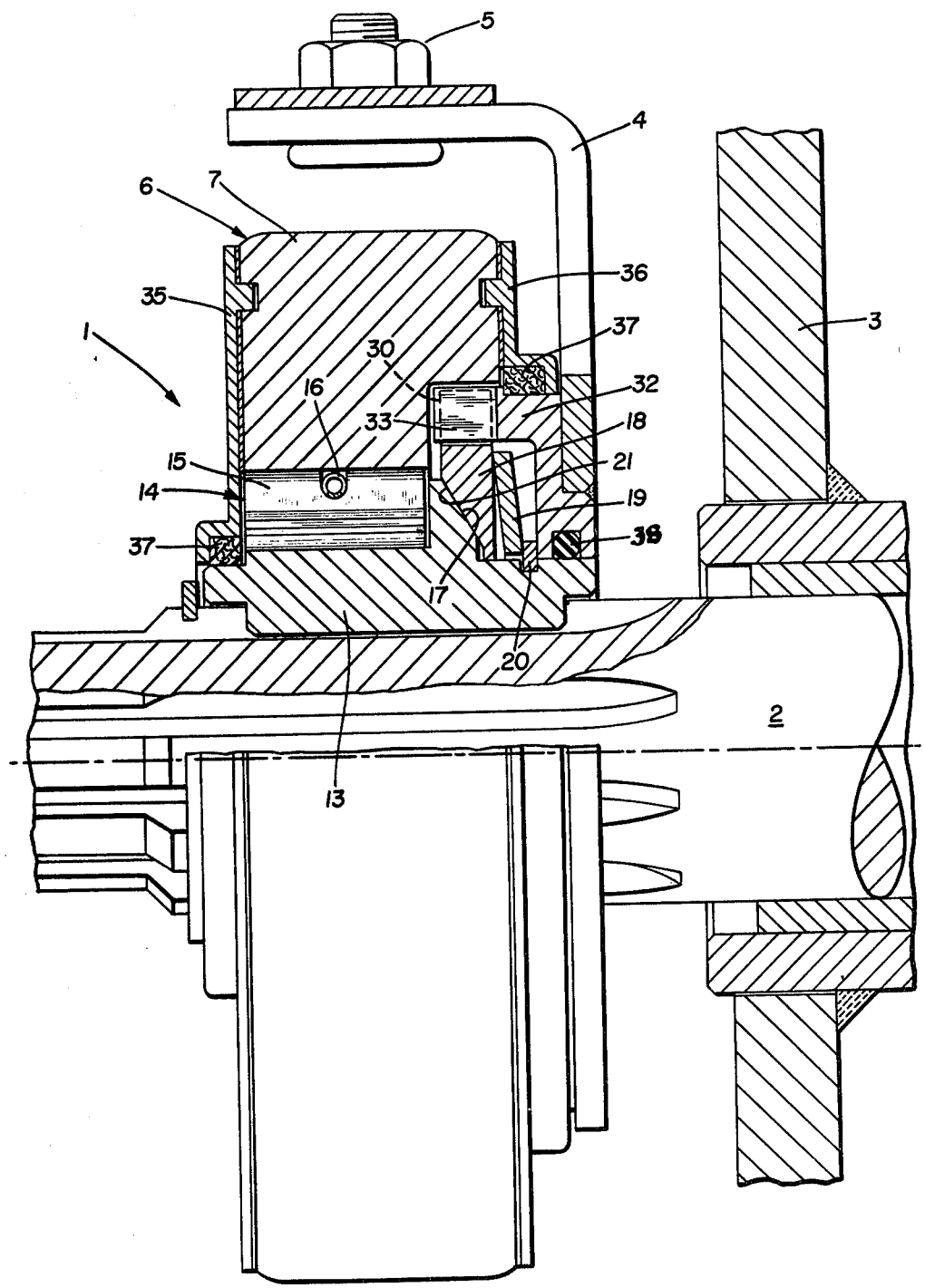
FIG. 2 is a side elevation partially in section along line 2—2 of FIG. 1.
Figure 3:
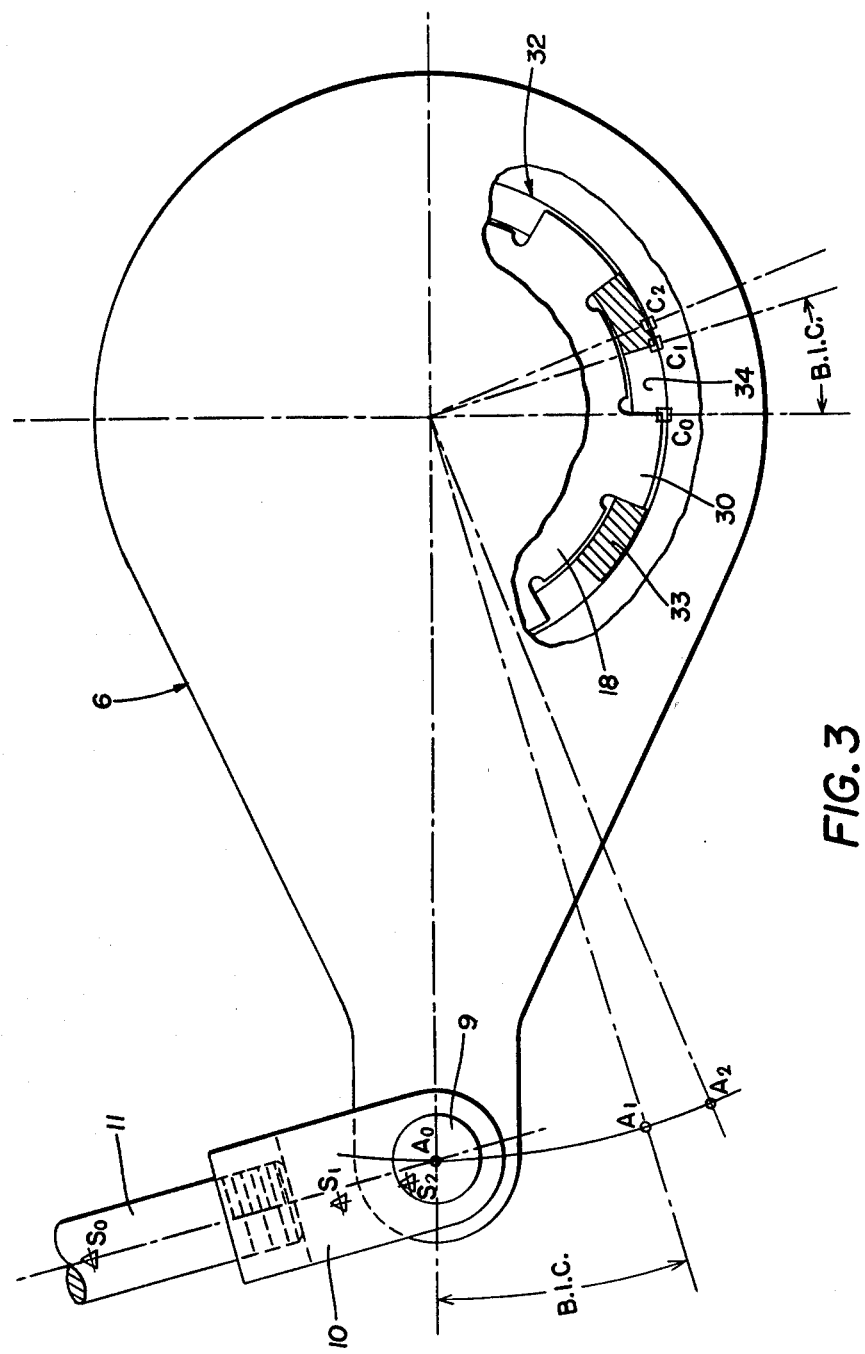
FIG. 3 is a side elevation partially broken away and showing the kinematics of the device of the invention.

The automatic slack adjuster 1 of FIGS. 1–3 is shown operatively engaged with a splined brake shaft 2, one end of which is shown in FIG. 2 supported as at 3, while the other end supports a conventional S-cam (not shown) for activating the brake shoes. Surrounding the brake shaft 2 and supported with respect to the vehicle chassis as by attachment plate 4 and attachment means 5 is the slack adjuster body 6. The body comprises a generally annular housing 7 having an attachment arm or lobe 8 to which a pin 9 pivotally fastens a clevis 10. The clevis comprises the end of an activating or push rod 11 which extends into and is acted upon by a pressure chamber 12 operated by brake pedal application.

Housed within body 6 is a splined bushing 13 which internally engages the splines on brake shaft 2 and externally is in contact with a one-way drive means, here a unidirectional sprag clutch 14. Clutch 14 is comprised of a series of metal shoes 15 properly aligned by a spring 16, each shoe larger in the radial direction than the space between bushing 13 and housing 7, but oriented so as to engage circumferentially and upon counterclockwise motion. In this manner, extension of the push rod 11 on brake application causes the attachment arm 8 to turn body 6 counterclockwise causing clutch engagement between bushing and body and turning the brake shaft 2. Upon release of the brake, the housing 7 rotates freely clockwise, slipping over the sprag shoes 15.

The bushing 13 carries at one end an external annular conical surface 17 in intimate contact with the conical surface 21 of a friction plate 18 biased by a large Bellville spring washer 19 held in preloaded position on bushing 13 by a snap ring 20 therein.

The edge of the friction plate 18 is divided into radial tangs 30 separated by spaces 31, for a purpose to be described hereafter.

A drive ring 32 is affixed against rotation to attachment plate 4 and provided around its outer margin with axial lobes 33 adapted to engage matching tangs 30 on friction plate 18 and spaced to provide an angular free space 34 between tangs 30 and lobes 33. This free space is denoted BIC (built-in clearance). Cover plates 35 and 36 and seals 37 and 38 enclose the assembly.

OPERATION OF THE DEVICE

The straight-through direct connection of push rod-body-clutch-bushing-brake shaft is seen from the following.

The application of brake pressure moves push rod 11, clevis 10 and pin 9 away from chamber 12; through the connection of pin 9 to the attachment arm 8, the housing 7 is thus rotated counterclockwise about the center line of the brake shaft 2. This motion causes the unidirectional sprag clutch 14 to engage and lock the adjuster body 6 to the bushing 13, turning it and the splined shaft 2 in a direction to engage the brake shoes with the brake drum.

As the body rotates counterclockwise toward engagement of the brakes, the conical surface 17 on bushing 13, through its frictional engagement with the mating conical face 21 on friction plate 18, will rotate the friction plate 18 from its position shown in FIG. 1.

The plate 18 can, however, only turn through the amount of angular free space 34, at the end of which the radial tangs 30 on plate 18 contact and stop against the axial lobes 33 on the drive ring 32. This "free" motion which provides for brake lining clearance, thermal expansion, etc., is again the BIC (built-in clearance).

After rotation of the plate 18 stops, the body, clutch, bushing and brake shaft continue turning to fully engage the brake with slippage occurring between the conical surfaces 17 and 21.

The above-described action may be seen in the kinematics set forth in FIG. 3. As the brake rod 11 moves from $S_0$ to $S_1$, the center of clevis pin 9, and thus the body 6, rotates counterclockwise from $A_0$ to $A_1$; correspondingly therewith, friction plate 18 rotates through the free angular space 34 from $C_0$ to $C_1$. This motion is the BIC.

Any further motion of the push rod to full engagement of the brakes, as for example from $S_1$ to $S_2$, causes further movement of the clevis pin from $A_1$ to $A_2$, and further rotation of body, sprag clutch, bushing and shaft, as well as slippage of bushing face 17 with respect to friction ring face 21 in the amount of $C_1$ to $C_2$.

This slip distance thus sets the adjustment which will actually occur when the body 6 again rotates clockwise from $A_2$ to $A_1$ to $A_0$ on the return stroke, as will now be explained.

On the return of the body 6, the S-cam shaft 2, the body 6, the clutch 14, and the bushing 13 will rotate backwards carrying along the friction plate 18 through the BIC arc due to the frictional engagement between the conical faces 17 and 21. At the point where the friction plate 18 and bushing 13 with shaft 2 are restrained from further backward rotation by engagement of the radial tangs 30 with the axial lobes 33 of the drive ring 32, the brake shaft and bushing are likewise held from further clockwise rotation due to the friction between surfaces 17 and 21. The body 6 nevertheless continues its clockwise rotation since it now slips over the unidirectional sprag clutch 14 seated on the exterior of the bushing 13. The body thus returns to its original null position, i.e., where the clevis pin 9 is again at $A_0$, with the push rod 11 at $S_0$, while the slack adjustment has been reset, awaiting the next application of the brakes.

Each time the brake is thus applied the mechanism body 6, after the built-in angular clearance $C_0$-$C_1$ is taken up, continues rotation as far as necessary to apply the brake fully and set the adjustment stroke, namely the distance $C_1$-$C_2$, carrying with it the bushing 13. Upon release of the brake, however, no matter how far the body 6 has had to rotate to reach its $A_2$ position to account for wear and brake application, the body and brake shaft return together "freely" only through the free distance $C_0$-$C_1$, whereupon the brake shaft stops turning. The body nevertheless continues by slipping rearwardly over the clutch and returns to its original null position $A_0$.

The slack adjuster thus continually adjusts itself automatically in that the bushing and brake shaft, having rotated in the forward power-application direction to apply the brakes, never counter-rotate further on the return stroke than the built-in clearance allows, while the body always returns to its previous position.

Although one preferred embodiment has been shown using a unidirectional sprag clutch, it will be clear that other types of clutches or, indeed, any one-way drive means may be used in its place, as for example a ratchet drive, without departing from the scope hereof.

Further, it will be clear that the device of the present invention may also be applied to the rotary actuating mechanisms of disc brakes.

I claim:

1. In a vehicle brake system, an automatic slack adjuster between the brake push rod and the brake shaft comprising:
   (a) an annular housing surrounding, and coaxial with, the brake shaft;
   (b) turning means within said housing engaging the brake shaft to turn it in a brake-applying direction, and having a first annular friction surface;
   (c) unidirectional drive means within said housing circumferentially engaging said housing and said turning means;
   (d) an annular ring fixed coaxially with respect to said housing and having axial lobes separated by circumferential spaces;
   (e) an annular plate mounted rotatably on said turning means, said plate having
      (1) a second annular friction surface, and
      (2) circumferentially spaced tangs extending radially within said spaces, said tangs each being of smaller circumferential extent than said spaces by a predetermined angular clearance;
   (f) means axially biasing said first and second annular friction surfaces into engagement; and
   (g) means connecting the push rod to said housing for rotation thereof.

2. Slack adjuster as in claim 1, wherein said turning means comprises a splined bushing.

3. Slack adjuster as in claim 1, wherein said unidirectional means comprises a one-way clutch.

4. Slack adjuster as in claim 1, wherein said unidirectional means comprises a sprag clutch.

5. Slack adjuster as in claim 1, wherein said axial lobes alternate with circumferential spaces.

6. Slack adjuster as in claim 1, wherein said connecting means comprises an attachment arm.

* * * * *